United States Patent
Chien et al.

(10) Patent No.: US 9,628,789 B2
(45) Date of Patent: Apr. 18, 2017

(54) REFERENCE MODE SELECTION IN INTRA MODE CODING

(71) Applicant: QUALCOMM Incorporated, San Diego, CA (US)

(72) Inventors: Wei-Jung Chien, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 13/678,334

(22) Filed: Nov. 15, 2012

(65) Prior Publication Data

US 2013/0128964 A1 May 23, 2013

Related U.S. Application Data

(60) Provisional application No. 61/561,803, filed on Nov. 18, 2011, provisional application No. 61/561,819, filed on Nov. 18, 2011.

(51) Int. Cl.
*H04N 19/50* (2014.01)
*H04N 19/70* (2014.01)
(Continued)

(52) U.S. Cl.
CPC ....... *H04N 19/00569* (2013.01); *H04N 19/11* (2014.11); *H04N 19/463* (2014.11); *H04N 19/50* (2014.11); *H04N 19/70* (2014.11)

(58) Field of Classification Search
None
See application file for complete search history.

(56) References Cited

U.S. PATENT DOCUMENTS 6,504,873 B1 * 1/2003 Vehvilainen ........... H04N 19/86
375/240.29
6,587,735 B1 * 7/2003 Yaguchi ........................... 700/2
(Continued)

FOREIGN PATENT DOCUMENTS

CN        101087424 A     12/2007
EP          1796395 A2      6/2007
(Continued)

OTHER PUBLICATIONS

Coding of Luma Intra Prediction when not in the MPM Set, Robert Cohen, Document JCTVC-G359_r2, 7th Meeting: Geneva, CH, Nov. 21-30, 2011.*

(Continued)

*Primary Examiner* — Jay Patel
*Assistant Examiner* — Shadan E Haghani
(74) *Attorney, Agent, or Firm* — Shumaker & Sieffert, P.A.

(57) ABSTRACT

A video coder can determine a first most probable intra prediction mode and a second most probable intra prediction mode for a current video block, and based on the first and second most probable intra prediction modes, determine an estimate of an actual intra prediction mode used to code the current video block. The estimate of the actual intra prediction mode can be determined by selecting one of the first most probable mode and the second most probable mode as the estimate of the actual intra prediction in response to both the first most probable mode and the second most probable mode being different angular prediction modes. The estimate of the actual intra prediction mode plus difference information can be used to identify the actual intra prediction mode used to code the current video block.

24 Claims, 7 Drawing Sheets

(51) Int. Cl.
*H04N 19/11* (2014.01)
*H04N 19/463* (2014.01)

(56) References Cited

U.S. PATENT DOCUMENTS

| | | | |
|---|---|---|---|
| 7,386,048 | B2 | 6/2008 | Sun et al. |
| 2004/0008771 | A1* | 1/2004 | Karczewicz ............. 375/240.03 |
| 2007/0036215 | A1 | 2/2007 | Pan et al. |
| 2009/0010557 | A1* | 1/2009 | Zheng et al. ................ 382/239 |
| 2010/0086034 | A1 | 4/2010 | Park et al. |
| 2010/0158103 | A1* | 6/2010 | Ye et al. ................... 375/240.02 |
| 2010/0208802 | A1* | 8/2010 | Tsukuba ........... H04N 19/00763 375/240.12 |
| 2011/0280304 | A1 | 11/2011 | Jeon et al. |
| 2011/0317757 | A1 | 12/2011 | Coban et al. |
| 2012/0082223 | A1 | 4/2012 | Karczewicz et al. |
| 2012/0170652 | A1 | 7/2012 | Guo et al. |

FOREIGN PATENT DOCUMENTS

| | | |
|---|---|---|
| JP | 2005528047 A | 9/2005 |
| WO | 03101117 A1 | 12/2003 |
| WO | 2010090749 A1 | 8/2010 |

OTHER PUBLICATIONS

WD4: Working Draft 4 of High-Efficiency Video Coding, Benjamin Bross, Document JCTVC-F803_d0, 6th Meeting: Torino, IT, Jul. 14-22, 2011.*

"Intra Mixture Prediction Mode and Enhanced Most Probable Mode Estimation for Intra Coding in H.264/AVC," Jinho Lee (2009).*

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Preliminary Report on Patentability—PCT/US2012/065532, The International Bureau of Wipo—Geneva, Switzerland, Feb. 25, 2014, 11 pp.

Second Written Opinion from International Application No. PCT/US2012/065532, dated Nov. 8, 2013, 11 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Bross et al., "WD4: Working Draft 4 of High-Efficiency Video Coding," Joint Collaborative Team on Video Coding, JCTVC-F803_d0, Jul. 14-22, 2011, 216 pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Chuang et al.,"Luma Intra Prediction Mode Coding", Joint Collaborative Team on Video Coding, JCTVC-F062, Jul. 14-22, 2011, 5 pp.

Cohen et al., "Non-CE6: Coding of luma intra prediction modes that are not in the MPM set," Joint Collaborative Team on Video Coding, JCTVC-G359_r2, Nov. 21-30, 2011, 13 pp.

International Search Report and Written Opinion—PCT/US2012/065532—ISA/EPO—Jan. 25, 2013—19 pp.

International Telecommunication Union, "Advanced video coding for generic audiovisual services," Standardization of ITU, Jun. 2011, 674 pp.

Lee et al., "Intra-Mixture Prediction Mode and Enhanced Most Probable Mode Estimation for Intra Coding in H.264/AVC", 2009 Fifth International Joint Conference on INC, IMS and IDC, IEEE, Aug. 25, 2009, 4 pp.

Maani et al., "CE6: Differential Coding of Intra Modes", Joint Collaborative Team on Video Coding, JCTVC-F566, Jul. 14-22, 2011, 16 pp.

Wiegand et al., "WD2: Working Draft 2 of High-Efficiency Video Coding"Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "Working Draft 1 of High-Efficiency Video Coding", Joint Collaborative Team on Video Coding, JCTVC-C403, Oct. 7-15, 2010, 137 pp.

Chien, et al., "Parsing friendly intra mode coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F459r2, Jul. 12, 2011; 5 pp.

Guo, et al., "Improved Intra Mode Coding", Joint Collaborative Team on Video Coding (JCT-VC) of ITU-T SG16 WP3 and ISO/IEC JTC1/SC29/WG11, 4th Meeting: Daegu, Korea, Jan. 20-28, 2011, JCTVC-D166, Jan. 15, 2011; 7 pp.

Kanumuri, et al., "Enhancements to Intra Coding", JCT-VC Meeting; MPEG Meeting; Jan. 20-28, 2011; Daegu; (Joint Collaborative Team on Video Coding of ISO/IEC JTC1/SC29/WG11AND ITU-T SG.16); URL: http:// wftp3.itu.int/av-arch/jctvc-site/, No. JCTVC-D235, Jan. 14, 2011; XP030008275, 7 pp.

Bossen, "Common Test Conditions and Software Reference Configurations," 6th Meeting: Jul. 14-22, 2011, Torino, IT, Joint Collaborative Team on Video Coding (JCT-VC), ITU-T SG16 WP3 and ISO/IEC JTC1/SC29/WG1, JCTVC-F900, Sep. 12, 2011, 3 pp.

* cited by examiner

REFERENCE MODE SELECTION IN INTRA MODE CODING

This application claims the benefit of U.S. Provisional Application 61/561,803 filed 18 Nov. 2011 and U.S. Provisional Application 61/561,819 filed 18 Nov. 2011, the entire content of each which are incorporated herein by reference.

TECHNICAL FIELD

This disclosure relates to video coding, and more particularly, to signaling of intra prediction modes for coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks. Each video block can be further partitioned. Video blocks in an intra-coded (I) frame or slice are encoded using spatial prediction with respect to neighboring video blocks. Video blocks in an inter-coded (P or B) frame or slice may use spatial prediction with respect to neighboring macroblocks or coding units in the same frame or slice or temporal prediction with respect to other reference frames.

SUMMARY

In general, this disclosure describes techniques for signaling and processing the signaling of coding characteristics for coded video data and, more particularly, this disclosure describes techniques for signaling and processing the signaling of intra prediction modes in an encoded bitstream of video data. In video coding, a block of video data currently being coded (either encoded or decoded) can be predicted from video blocks of previously coded pictures (i.e. inter prediction) or can be predicted from already coded video blocks of the same picture (i.e. intra prediction). When a video block is intra predicted, the mode of intra prediction is sometimes signaled as a difference between an estimated actual intra prediction mode and the actual intra prediction mode, as opposed to the actual intra prediction mode being signaled explicitly. Assuming the actual intra prediction mode is usually close to the estimated intra prediction mode, then using variable length coding (VLC) techniques, the actual intra prediction mode can be signaled using relatively few bits. The techniques of this disclosure may, in some instances, improve efficiency for signaling of an intra prediction mode used to intra-code a block of video data by, in some coding scenarios, determining estimated intra prediction modes that are closer to actual intra prediction modes.

In one example, a method for coding video data includes for a current video block, determining a first most probable intra prediction mode and a second most probable intra prediction mode; and based on the first most probable intra prediction mode and the second most probable intra prediction mode, determining an estimate of an actual intra prediction mode used to code the current video block. Determining the estimate of the actual intra prediction mode includes in response to the first most probable mode being an angular intra prediction mode and the second most probable mode being a non-angular intra prediction mode, selecting the first most probable mode as the estimate of the actual intra prediction mode; and, in response to both the first most probable mode and the second most probable mode being different angular prediction modes, selecting one of the first most probable mode and the second most probable mode as the estimate of the actual intra prediction.

In another example, a device for coding video data includes a video coder configured to for a current video block, determine a first most probable intra prediction mode and a second most probable intra prediction mode and based on the first most probable intra prediction mode and the second most probable intra prediction mode, determine an estimate of an actual intra prediction mode used to code the current video block. The video coder is configured to determine the estimate of the actual intra prediction mode by in response to the first most probable mode being an angular intra prediction mode and the second most probable mode being a non-angular intra prediction mode, select the first most probable mode as the estimate of the actual intra prediction mode; and, in response to both the first most probable mode and the second most probable mode being different angular prediction modes, select one of the first most probable mode and the second most probable mode as the estimate of the actual intra prediction.

In another example, an apparatus for coding video data includes means for determining a first most probable intra prediction mode and a second most probable intra prediction mode for a current video block and means for determining an estimate of an actual intra prediction mode used to code the current video block based on the first most probable intra prediction mode and the second most probable intra prediction mode. The means for determining the estimate of the actual intra prediction mode includes means for selecting the first most probable mode as the estimate of the actual intra prediction mode in response to the first most probable mode being an angular intra prediction mode and the second most probable mode being a non-angular intra prediction mode and means for selecting one of the first most probable mode and the second most probable mode as the estimate of the actual intra prediction in response to both the first most probable mode and the second most probable mode being different angular prediction modes.

In another example, a computer-readable storage medium storing instructions operable to cause one or more processors to for a current video block, determine a first most probable intra prediction mode and a second most probable intra prediction mode; and, based on the first most probable intra prediction mode and the second most probable intra prediction mode, determine an estimate of an actual intra prediction mode used to code the current video block. The instructions cause the one or more processors to determine the estimate of the actual intra prediction mode by in response to the first most probable mode being an angular intra prediction mode and the second most probable mode being a non-angular intra prediction mode, selecting the first most probable mode as the estimate of the actual intra prediction mode; and, in response to both the first most probable mode and the second most probable mode being different angular prediction modes, selecting one of the first most probable mode and the second most probable mode as the estimate of the actual intra prediction.

The details of one or more examples are set forth in the accompanying drawings and the description below. Other features, objects, and advantages will be apparent from the description and drawings, and from the claims.

DETAILED DESCRIPTION

Figure 1:
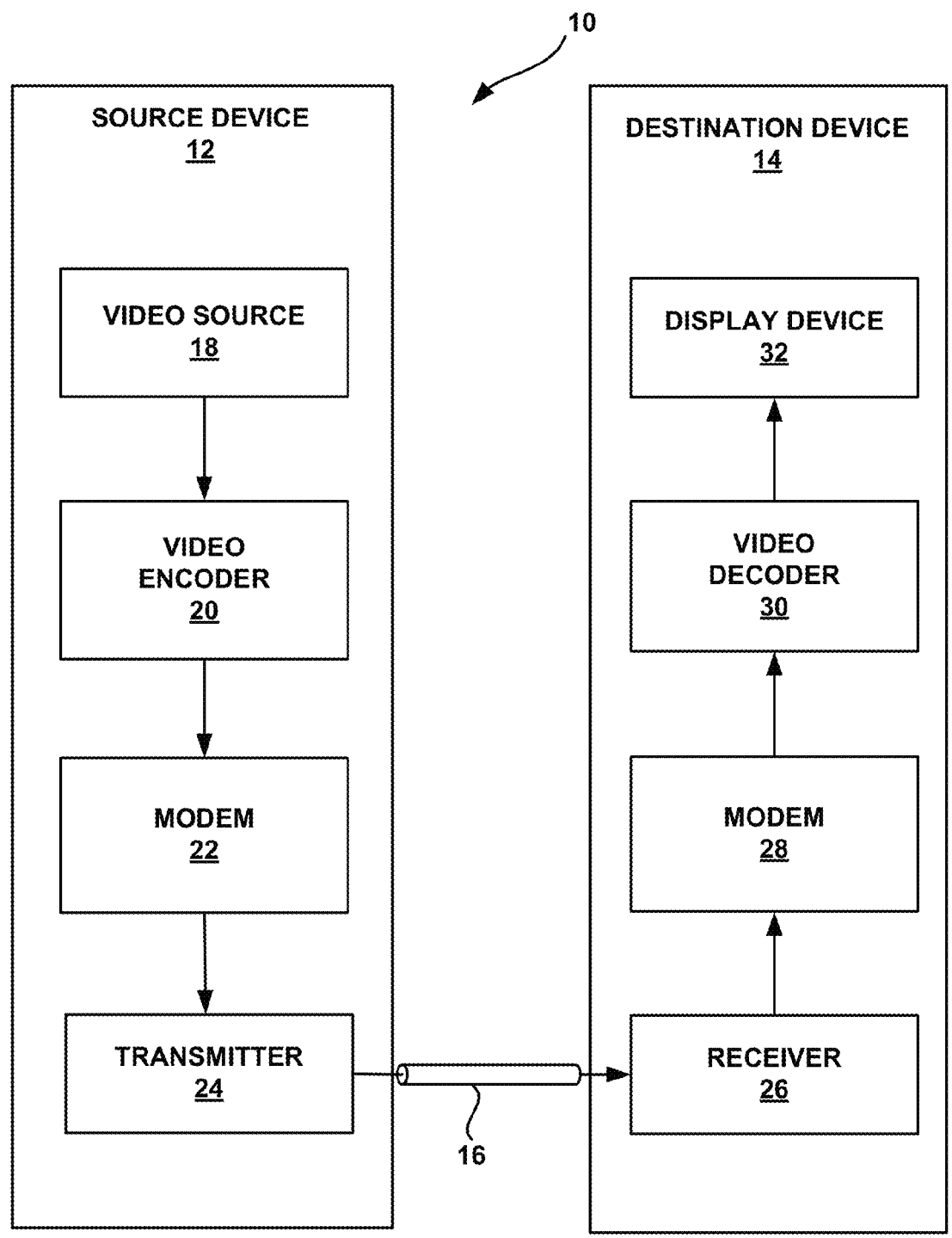
FIG. 1 is a block diagram illustrating an example video encoding and decoding system that may utilize the techniques of this disclosure.

In general, this disclosure describes techniques for signaling and the processing the signaling of coding characteristics for coded video data and, more particularly, this disclosure describes techniques for signaling and processing the signaling of intra prediction modes in an encoded bitstream of video data. In video coding, a block of video data currently being coded (e.g. either encoded or decoded) can be predicted from video blocks of previously coded pictures (i.e. inter prediction) or can be predicted from already coded video blocks of the same picture (i.e. intra prediction). When a video block is intra predicted, the mode of intra prediction is sometimes signaled as a difference between a reference mode, also referred to in this disclosure as an estimate of the actual intra prediction mode, and the actual intra prediction mode, as opposed to the actual intra prediction mode being signaled explicitly. As will be explained in greater detail below, the different modes of intra prediction generally correspond to different angles of prediction, although certain modes are considered to be non-angular.

Assuming the actual intra prediction mode is usually close to the estimated intra prediction mode, then using variable length coding (VLC) techniques, the actual intra prediction mode can be signaled using relatively few bits. The techniques of this disclosure may, in some instances, improve efficiency for signaling of an intra prediction mode used to intra-code a block of video data by, in some coding scenarios, determining estimated intra prediction modes that are closer to actual intra prediction modes.

The estimated intra prediction mode for a current block can be determined based on most probable intra prediction modes for the block. These most probable intra prediction modes may at times in this disclosure be referred to simply as most probable modes. As will be explained in greater detail below, the most probable modes for a current video block may be selected, at least in part, based on the intra prediction modes of already coded neighboring blocks. For example, a current block may have two most probable modes corresponding to the intra prediction mode used to code a block above the current block and to the intra prediction mode used to code a block to the left of the current block. Assuming video blocks are coded in a raster scan order (e.g. left-to-right and top-to-bottom), the video blocks above the current block and to the left of the current block will be coded before the current block, and therefore, the intra prediction modes of those blocks are known to the video coder prior to coding the current block. A current block may also have additional most probable modes (e.g. a third most probable mode, a fourth most probable mode, etc.) that are also determined based on neighboring blocks or that are determined in some other manner.

Assuming two most probable modes, when one of the most probable intra prediction modes is the actual intra prediction mode for a current block, then the actual intra prediction mode may be signaled using a two bit codeword to indicate that the block is coded using one of the most probable modes. The codeword "00" may, for example, be used to signal that the actual intra prediction mode for the block is the first most probable mode, and the codeword "01" may be used to signal that the actual intra prediction mode for the block is the second most probable mode. If using more than two most probable modes, then in some instances additional bits may be used for signaling which most probable mode is the actual mode.

In instances where the mode selected for use—also referred to as the actual mode or the selected mode—is different than one of the most probable modes, then the actual mode can be either signaled directly or can be signaled using differential information between the actual mode and an estimate of the actual mode. In these instances, the actual intra prediction mode can be signaled using a codeword that begins with "1" to distinguish the codewords from the codewords for the most probable modes. The example above is one of many coding structures in which most probable modes can be used to signal the intra prediction mode of a video block. The techniques of this disclosure are not limited to any one particular structure for utilizing most probable modes.

When signaling intra prediction modes as a difference between an estimated mode and an actual mode, the difference information may be signaled from a video encoder to a video decoder as a codeword in an encoded bitstream. The codeword may, for example, be a variable length codeword that corresponds to a difference in a sequential mode order between the estimate of the actual mode and the actual mode. If using variable length codewords, shorter codewords may, for example, be assigned to the more frequently occurring differences while longer codewords are assigned to less frequently occurring differences. The more frequently occurring differences may, for example, be the shorter differences, while the less frequently occurring differences are the longer distances. Thus, fewer bits are generally used to signal the difference information when the estimate of the actual intra prediction mode is close to the actual prediction than when the estimate of the actual intra prediction mode is far from the actual intra prediction mode. As will be explained in greater detail in examples below, the distance between two intra prediction modes can generally be considered to be the absolute value of the difference in their sequential mode orders. Thus, modes with sequential mode orders of 3 and 15 can be considered to be farther apart than modes with sequential mode orders of 8 and 6.

According to current techniques, when two modes in the most probable mode set are angular (i.e., as opposed to non-angular), the estimated mode is determined as the mean or median of the angle of the two most probable modes. This estimated mode, however, in some instances may not be all that close, in terms of sequential mode order for example, to the actual mode used for a current video block. It may, thus, be more accurate to use one of the most probable modes as the estimate of the actual mode instead of using the mean or the median of two most probable modes. For example, if edges exist in a neighboring block, then the most probable modes may convey the information fairly precisely. The edge may shift by one or two angles from one of the most probable modes, but the edge may be unlikely to shift to the middle angle of the two most probable modes, especially when angles of two most probable modes differ by a large amount. In other words, if two most probable modes have a relatively large angle difference, then an estimate based on a mean or median of those two most probable modes might, with a higher than desired frequency, assign a shorter codeword to a mode which is less likely to be the actual mode, which can reduce coding efficiency. This disclosure generally describes techniques for determining an estimate of the actual intra prediction mode by selecting one of the two most probable modes to be the estimate of the actual intra prediction mode.

The estimate of the actual intra prediction mode can be used, for example, in conjunction with difference information to identify the actual intra prediction mode used to code a block of video data. Thus, if a video encoder and video decoder are configured to both determine the same estimate for an actual intra prediction mode, then only the difference between the estimate of the actual intra prediction mode and the actual intra prediction mode needs to be conveyed in the encoded bitstream in order for the video decoder to determine the intra prediction mode used to code the block of video data.

FIG. 1 is a block diagram illustrating an example video encoding and decoding system 10 that may utilize techniques for coding syntax data representative of intra prediction modes for blocks of video data in accordance with the techniques of this disclosure. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern coding of syntax data representative of intra prediction modes for blocks of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data. Moreover, communication channel 16 is intended to represent just one of many ways in which a video encoding device might transmit data to a video decoding device. For example, in other configurations of system 10, source device 12 might generate encoded video for decoding by destination device 14 and store the encoded video on a storage medium or a file server, such that the encoded video may be accessed by destination device 14 as desired.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera. Likewise, destination device 14 may interface with an external display device, rather than including an integrated display device. Video encoder 20 and a video decoder 30 may be similarly configured to perform the techniques of this disclosure. For example, video encoder 20 and video decoder 30 can be configured to determine most probable modes and estimated modes using the same techniques, such that most probable modes and estimated modes do not need to be explicitly signaled in the encoded video bitstream.

The illustrated system 10 of FIG. 1 is merely one example. Techniques for coding syntax data representative of intra prediction modes for blocks of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding syntax data representative of intra prediction modes for blocks of video data. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. Block sizes that are less than 16×16 may be referred to as partitions of a 16×16 macroblock in ITU-T H.264.

Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP) also referred to as a sequence, or another independently decodable unit defined according to applicable coding techniques.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra prediction modes, HM provides as many as thirty-three intra prediction modes, e.g., based on the size of a block being intra prediction coded. A recent draft of the HEVC standard, referred to as "HEVC Working Draft 9" or "WD9," is described in document JCTVC-K1003, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, Conn. 10-19 Oct. 2012, which, as of 13 Nov. 2012, is downloadable from the following link: http://phenix.int-evry.fr/jct/doc_end_user/documents/ 11_Shanghai/wg11/JCTVC-K1003-v7.zip.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, a prediction unit (PU), or a transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra prediction mode encoded, the PU may include data describing an intra prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra prediction mode encoded, or inter-prediction mode encoded.

A CU having one or more PUs may also include one or more transform units (TUs). Following prediction using a PU, a video encoder may calculate a residual value for the portion of the CU corresponding to the PU. A set of residual values may be transformed, scanned, and quantized to define a set of transform coefficients. The TU defines a data structure that includes the transform coefficients. A TU is not necessarily limited to the size of a PU. Thus, TUs may be larger or smaller than corresponding PUs for the same CU. In some examples, the maximum size of a TU may correspond to the size of the corresponding CU.

In accordance with the techniques of this disclosure, video encoder 20 may encode certain blocks of video data using intra prediction mode encoding, and provide information indicating a selected (i.e. actual) intra prediction mode used to encode the block. Video encoder 20 may intra prediction encode blocks of any type of frame or slice using an intra prediction mode, e.g., I-frames or I-slices, in addition to P-frames or P-slices and B-frames or B-slices. When video encoder 20 determines that a block should be intra prediction mode encoded, video encoder 20 may perform a rate-distortion analysis to select a most appropriate intra prediction mode. For example, video encoder 20 may calculate rate-distortion values for one or more intra prediction modes, and select one of the modes having acceptable rate-distortion characteristics.

Video encoder 20 may also be configured to determine an encoding context for the block. The context may include various characteristics of the block such as, for example, a size of the block, which may be determined in terms of pixel dimensions, prediction unit (PU) type such as, in the example of HEVC, 2N×2N, N×2N, 2N×N, N×N, short-distance intra prediction (SDIP) types such as 2N×N/2, N/2×2N, 2N×1, 1×2N, a macroblock type in the example of H.264, a coding unit (CU) depth for the block, or other measurements of size for a block of video data. In some examples, the context may be determined based on information, such as a coding mode, for an above-neighboring block, a left-neighboring block, an above-left neighboring block, an above-right neighboring block, or other neighboring blocks. In some examples, the context may include both intra prediction modes for one or more blocks as well as size information for the current block being encoded.

In any case, video encoder 20 may include configuration data that maps the context for the block to various coding characteristics for the current block. For example, based on the context for the block, the configuration data may indicate one or more most probable intra prediction modes and/or one or more variable length code (VLC) tables. As introduced above, the VLC tables may map codewords to difference values. The difference values may, for example, be differences in a sequential mode order between an actual mode and an estimated mode.

Video encoder 20 may, in some examples, be configured to begin analysis for selection of an intra prediction mode with the most probable modes, based on the context. When the most probable mode achieves suitable rate-distortion characteristics, in some examples, video encoder 20 may select the most probable mode. In other examples, video encoder 20 need not begin the selection process with the most probable mode.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video decoder 30 ultimately receives encoded video data, for example from modem 28 and receiver 26, from a file server, for a storage medium, or in some other manner. In accordance with the techniques of this disclosure, video decoder 30 may receive a codeword representative of a syntax element identifying an intra prediction mode used to encode a block of video data. Video decoder 30 may be configured to determine a coding context for the block in a manner substantially similar to video encoder 20. Moreover, video decoder 30 may include similar configuration data to video encoder 20, e.g., information for determining most probable modes based on the modes of neighboring blocks. Video decoder 30 can determine an estimate for the actual intra prediction mode in a similar manner to video encoder 20. That is, video decoder 30 may be configured to apply a process that is identical or similar to the process used by video encoder 20 to determine the most probable mode and estimate of the actual intra prediction mode. In this manner, video decoder 30 determines the same most probable modes and the same estimate of the actual intra prediction mode as video encoder 20. Based on the received codeword, video decoder 30 can then determine a difference between the estimated intra prediction mode and the actual intra prediction mode. Thus, based on the codeword and the estimated intra prediction mode, video decoder 30 can determine the actual intra prediction mode. In one example, video decoder 30 sums the difference value indicated by the codeword with the value indicated by the estimated intra prediction mode to produce a value that indicates the actual intra prediction mode for a the current block to be decoded.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
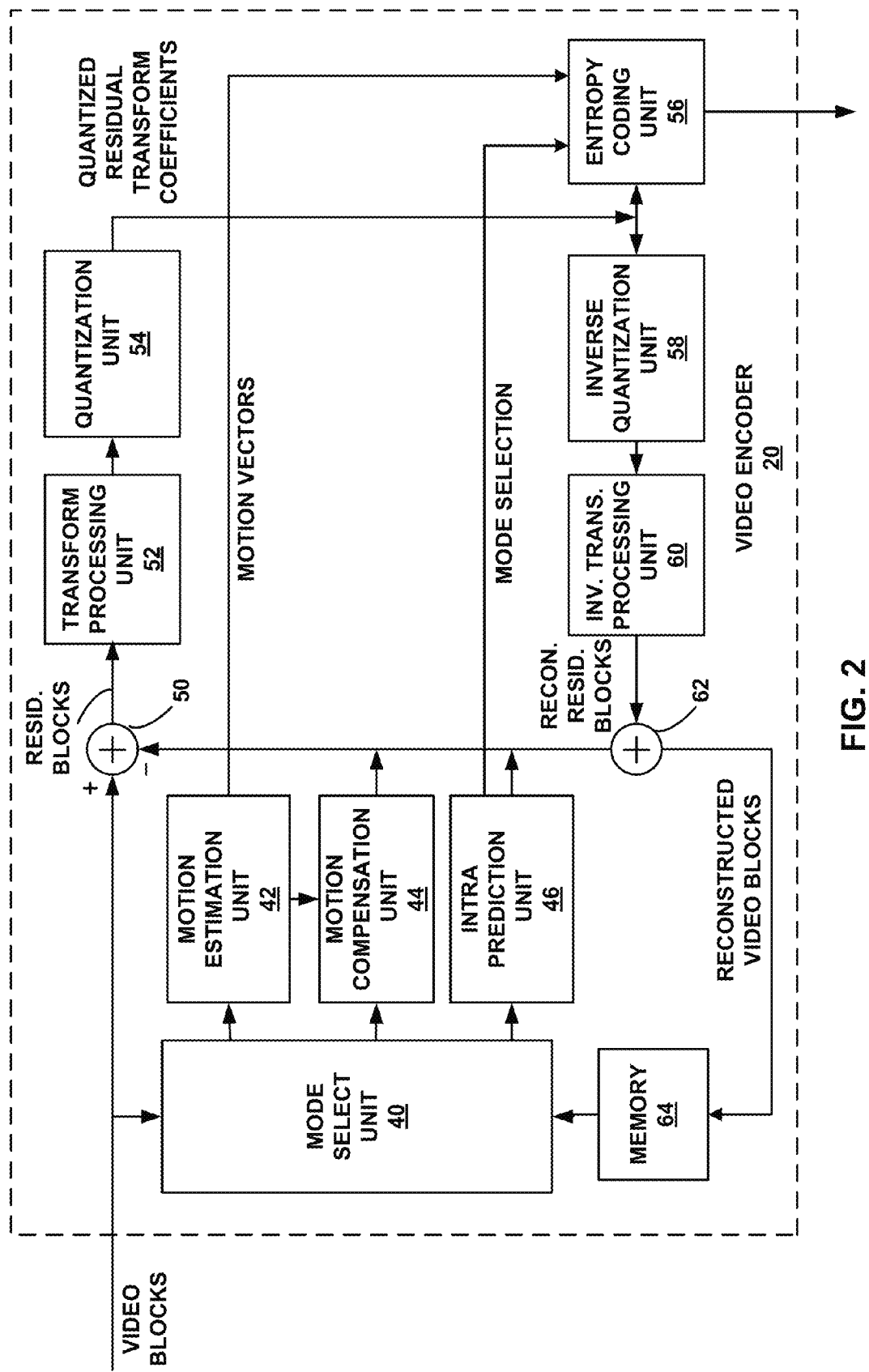
FIG. 2 is a block diagram illustrating an example of a video encoder that may implement techniques for coding information indicative of an intra prediction mode.

FIG. 2 is a block diagram illustrating an example of video encoder 20 that may implement techniques for coding information indicative of an intra prediction mode. Video encoder 20 may perform intra- and inter-coding of video blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra prediction mode (I-mode) may refer to any of several spatial based compression modes and inter-prediction mode, such as uni-directional prediction (P-mode) or bi-directional prediction (B-mode), may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, memory 64, summer 50, transform processing unit 52, quantization unit 54, and entropy coding unit 56. For video block reconstruction, video encoder 20 also includes inverse quantization unit 58, inverse transform processing unit 60, and summer 62. One or more loop filters such as a deblocking filter, a sample adaptive offset filter, and an adaptive loop filter, which are not shown in FIG. 2, may also be included to filter the reconstructed video blocks. If desired, the one or more loop filters would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 40 selects one of the coding modes, intra or inter, e.g., based on error results and based on a frame or slice type for the frame or slice including a current block being coded, and provides the resulting intra- or inter-coded block to summer 50 to generate residual block data and to summer 62 to reconstruct the encoded block for use in a reference frame or reference slice. In general, intra prediction involves predicting a current block relative to pixel samples in neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in memory 64. Motion compensation unit 44 may also interpolate sub-integer pixels of the reference frame, e.g., an I-frame or a P-frame. The ITU H.264 and HEVC standards, as examples, describe the use of two reference picture lists: list 0, which includes reference frames having a display order earlier than a current frame being encoded, and list 1, which includes reference frames having a display order later than the current frame being encoded. Therefore, data stored in memory 64 may be organized according to these lists.

Motion estimation unit 42 compares blocks of one or more reference frames from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in memory 64 if no values for sub-integer pixel positions are stored in memory 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the inter-predictive block.

Intra prediction unit 46 may intra-predict a current block, as an alternative to the inter-prediction performed by motion estimation unit 42 and motion compensation unit 44, as described above. In particular, intra prediction unit 46 may determine an intra prediction mode to use to encode a current block. In some examples, intra prediction unit 46 may encode a current block using various intra prediction modes, e.g., during separate encoding passes, and intra prediction unit 46 (or mode select unit 40, in some examples) may select an appropriate intra prediction mode to use from the tested modes. For example, intra prediction unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction unit 46 may calculate ratios from the distortions and rates for the various encoded blocks to determine which intra prediction mode exhibits the best, or a desirable, rate-distortion value for the block.

Figure 3A:
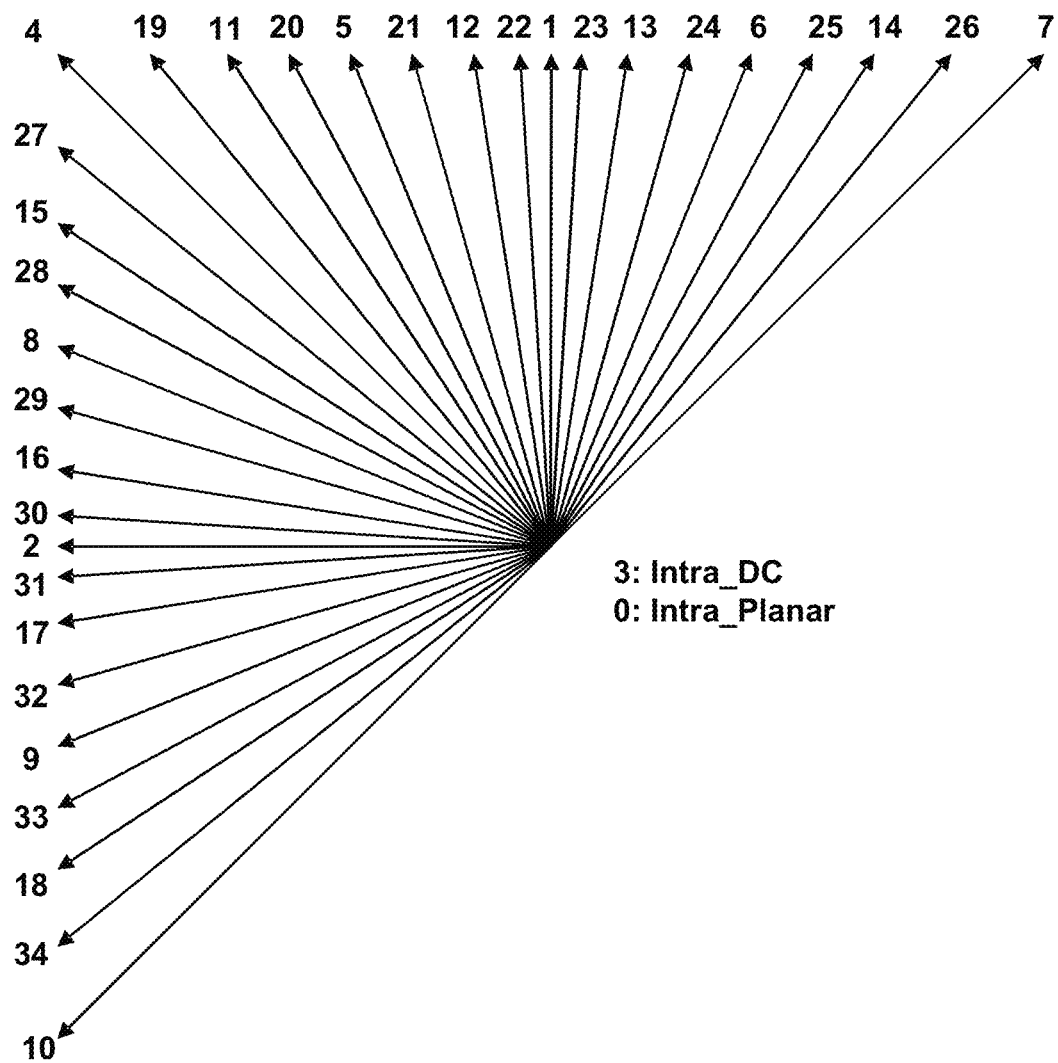
FIG. 3A shows an example of intra prediction modes.

The techniques of this disclosure may be applied to encoding standards and techniques, such as HEVC. In some examples, such as in HEVC, the number of available intra prediction modes may depend on the size of a block (e.g., a "coding unit" or "CU" in HEVC) being coded. For each intra prediction mode, a mode index can be assigned. FIG. 3A shows an example of intra prediction modes and corresponding mode indexes that may be used with HEVC. The arrows of FIG. 3A represent a prediction direction, and the numbers represent a mode index. The mode indexes shown in FIG. 3A should not be assumed to correspond to any reference numerals used in other figures.

Figure 3B:
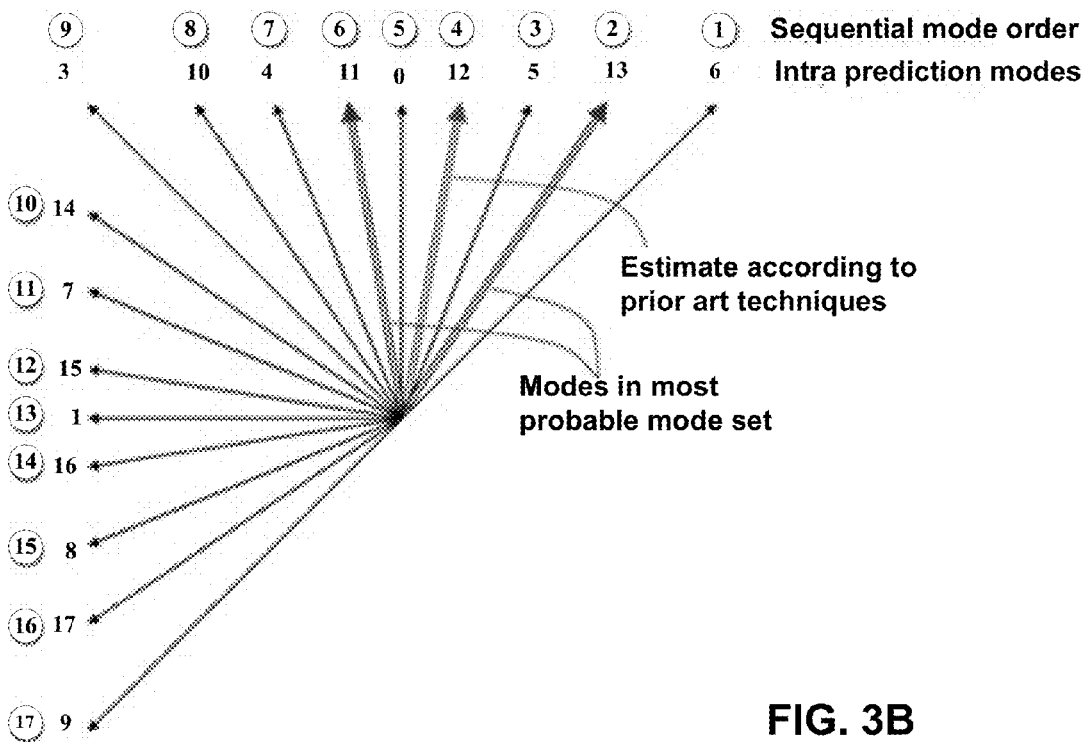
FIGS. 3B and 3C show examples of most probable intra prediction modes and estimated actual intra prediction modes.
Figure 3C:
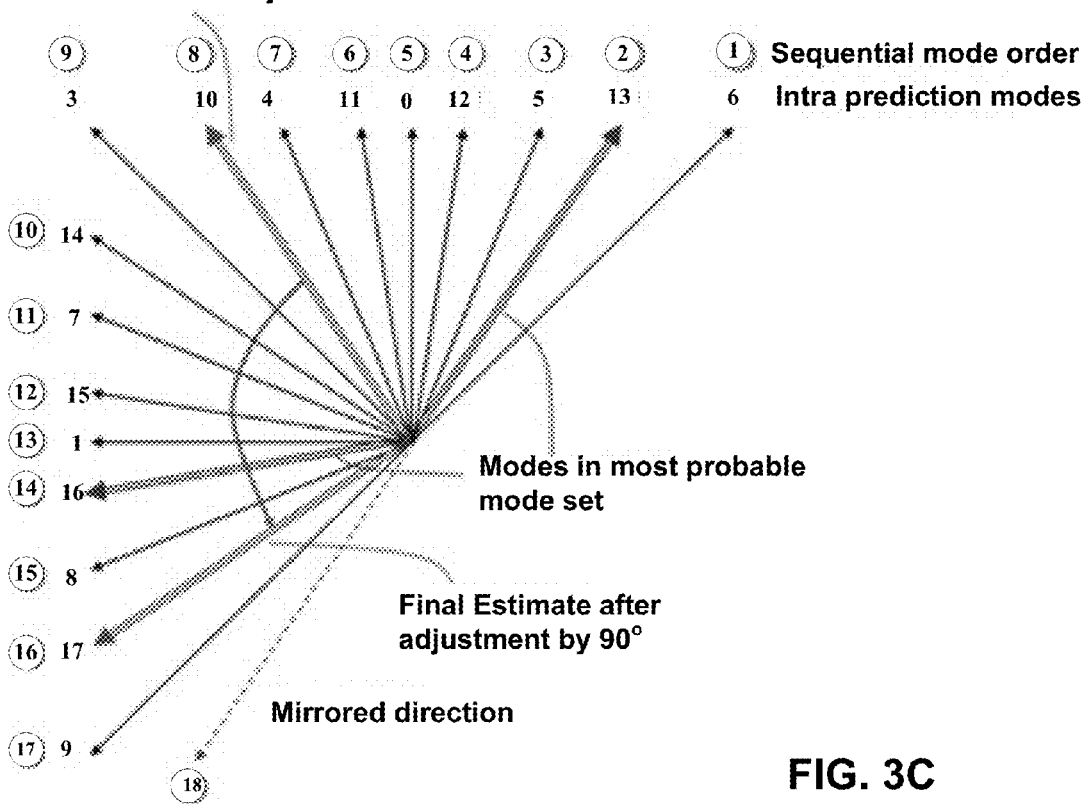

As shown in the examples of FIGS. 3B and 3C, each mode may also have a sequential mode order that differs from the mode index. In general, there are two kinds of intra prediction modes: (1) Angular modes in which intra prediction is performed along a certain direction, and (2) non-angular modes such as DC and Planar prediction. When both modes in a most probable mode set are angular, the estimate of the actual mode, according to currently known techniques, may be the mean or median of that angle, as shown in the examples of FIGS. 3B and 3C. This disclosure describes new techniques for determining an estimate of the actual intra prediction mode.

FIG. 3B shows an example of two modes in a most probable mode set. The modes of FIG. 3B are labeled in two different manners. The numbers not in circles correspond to intra prediction mode indexes. Intra prediction mode indexes may, for example, correspond to how frequently a mode is expected to be used in coding but do not necessarily need any such correlation. The numbers in circles represent a sequential mode order. The sequential mode ordering corresponds to an ordering of the modes based on their angle of prediction. In sequential mode ordering, for example, the angle of the mode with sequential mode order 6 in between the angle of the mode with sequential mode order 5 and the angle of the mode with sequential mode order 7. In the example of FIG. 3B, the two most probable modes are the intra prediction modes with mode indexes 11 and 13. These two most probable modes may, for example, correspond to the modes used to code two neighboring blocks.

According to prior art techniques, the estimate of the actual intra prediction mode based on the two most probable modes might be a mean or median of the sequential mode orders of the two most probable modes. Thus, in the example of FIG. 3B, according to the prior art techniques, the estimate of the actual intra prediction mode might be intra prediction mode 12 because sequential mode order 4 is the mean of sequential mode order 6 and sequential mode order 2. According to techniques of this disclosure, however, one of the two most probable modes, rather than a mean or median, may be selected as the estimate of the actual intra prediction mode. Thus, according to the techniques of this disclosure, the estimate of the actual intra prediction mode may be either intra prediction mode 11 or intra prediction mode 13 instead of intra prediction mode 12. Techniques for selecting which of intra prediction mode 11 and intra prediction mode 13 is used as the estimate for the actual intra prediction mode will be discussed in more detail below.

FIG. 3C shows examples of alternate prior art techniques that may be used for determining an estimate of an actual intra prediction mode when two most probable modes in a most probable mode set are far apart (i.e., have a large difference in angle). In the example of FIG. 3C, the two most probable modes are the intra prediction modes with mode indexes 13 and 16. According to one prior art technique, when the angle between the two most probable modes is large, a mean or median can be determined for the two most probable modes, and the estimate of the actual intra prediction mode can be the mean or median adjusted by 90 degrees (e.g., mode 17 in the example of FIG. 3C, which is rotated 90 degrees from mode 10). Alternatively, a mean or median can be determined between one most probable mode and a mirrored direction of the other most probable mode. According to the techniques of this disclosure, however, the estimate of the actual intra prediction mode may be one of the most probable modes even when the most probable modes are far apart. Thus, in the example of FIG. 3C, the estimate of the actual intra prediction mode may be either intra prediction mode 16 or intra prediction mode 13 instead of intra prediction mode 17. Techniques for selecting which of intra prediction mode 16 and intra prediction mode 13 is used as the estimate for the actual intra prediction mode will be discussed in more detail below.

The most probable modes in FIGS. 3B and 3C may correspond to the modes of already-coded neighboring blocks. FIGS. 3B and 3C are intended to represent two examples, and the particular most probable modes in these examples have been selected at random for purposes of explanation. Any two modes shown in FIG. 3B or 3C could potentially be most probable modes according to the techniques of this disclosure.

Table 1 below shows one example of a potential correspondence between a CU size and a number of intra prediction modes available to encode CUs of that size. As can be seen by the example of Table 1, 8×8, 16×16, and 32×32 CUs may use the 35 intra prediction modes shown in FIG. 3A, while 4×4 and 64×64 CUs use a smaller set of intra prediction modes.

TABLE 1

| Coding Unit Size | Number of Intra prediction Modes |
| --- | --- |
| 4 × 4 | 18 |
| 8 × 8 | 35 |
| 16 × 16 | 35 |
| 32 × 32 | 35 |
| 64 × 64 | 4 |

In any case, after selecting an intra prediction mode for a block, intra prediction unit 46 may provide information indicative of the selected intra prediction mode for the block to entropy coding unit 56. Entropy coding unit 56 may encode the information indicating the actual intra prediction mode in accordance with the techniques of this disclosure. For example, video encoder 20 may signal in an encoded bitstream difference information that identifies a difference between an actual intra prediction mode for the current block and the estimate of the actual intra prediction mode. As explained above, the actual intra prediction can be determined based on rate-distortion analysis, while the most probable intra prediction modes can be determined based on context information, such as the modes used to code already-coded neighboring blocks.

According to the techniques of this disclosure, intra prediction unit 46 can determine an estimate of the actual mode, based on most probable modes, according to one or more different criteria. The most probable modes can be determined based on a context derived from data associated with one or more neighboring blocks, such as modes used to code the neighboring blocks and/or sizes of the neighboring blocks.

Figure 4:
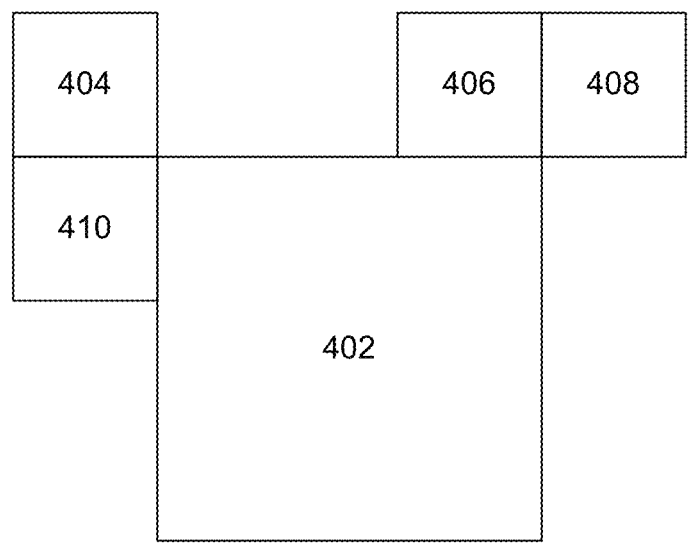
FIG. 4 shows an example of a current block and neighboring blocks that may be used to determine most probable modes for the current block.

FIG. 4 shows an example of a current block and neighboring blocks that may be used to determine most probable modes for the current block. Block 402 represents an example of a block currently being coded. Block 404 represents an example of an upper-left neighboring block. Block 406 represents an example of an upper neighboring block. Block 408 represents an example of an upper-right neighboring block, and block 410 represents an example of a left-neighboring block. Assuming the blocks are being coded in a raster scan order of left-to-right and top-to-bottom, then block 404, block 406, block 408, and block 410 are coded prior to block 402 being coded. Therefore, the coding modes of these neighboring blocks are known prior to block 402 being coded. Any of block 404, block 406, block 408, and block 410, as well as other already-coded neighboring blocks not shown, may be used to determine most probable modes for block 402.

For purposes of example, assume block 406 and block 410 are used to determine most probable modes for block 402. Additionally, assume that block 402 has three most probable modes. In instances where block 406 and block 410 are coded using the same angular mode, then the three most probable modes might be the angular mode used to code block 406 and block 410 as well as the two angular modes adjacent that mode. In instances where block 406 and block 410 are coded using different angular modes, then each of those angular modes can be used as a most probable mode, and the third most probable mode can be selected from one of the non-angular modes (e.g. planar or DC). In instances, where one of block 406 and block 410 is coded using an angular mode and the other is coded using a non-angular mode, then both the angular mode and the non-angular mode can be used as most probable modes, and the third most probable mode can be selected to be a different non-angular mode than the non-angular mode already being used as a most probable mode or can be selected to be some other modes. These examples represent just a few of many ways in which video encoder 20 and video decoder 30 can determine most probable modes.

As described above, after the most probable modes are determined, intra prediction unit 46 may generate one or more syntax elements indicating if the actual intra prediction mode for the block being coded is one of the most probable modes. If the actual intra prediction mode is not one of the most probable intra prediction modes, then intra prediction unit 46 may determine an estimate for the actual mode based on the most probable modes, and generate a syntax element indicating a difference between the actual intra prediction mode and the estimate for the actual intra prediction mode. In instances where video encoder 20 is configured to determine more than two most probable modes, such as the three most probable modes in the example described above with reference to FIG. 4, video encoder 20 may determine the estimate of the actual prediction using fewer than all of the most probable modes. As one example, video encoder 20 may determine the estimate of the actual intra prediction mode using the two most probable modes that correspond to the modes of the two neighboring blocks but not using the third most probable mode.

According to the techniques of this disclosure, when one most probable mode is an angular prediction mode and another most probable mode is a non-angular prediction mode, then intra prediction unit 46 may determine an estimate for the actual intra prediction mode by using the angular most probable mode as the estimate of the actual intra prediction mode.

When both most probable modes are angular prediction modes, the estimate of the actual mode can be one of the most probable modes. In instances where the first most probable mode and the second most probable mode are both angular modes but are not the same mode, then intra prediction unit 46 can select one of the two most probable modes to be the estimate of the actual mode, as opposed to using a mean or median of the two most probable modes as the estimate of the actual intra prediction mode. This may, for example, occur when two neighboring blocks both have angular modes but different angular modes. In instances where the neighboring blocks have the same angular mode, then that angular mode can be one of the most probable modes, and if the actual intra prediction mode is not used to code the block, then intra prediction unit 46 can use that angular mode as the estimate of the actual intra prediction mode.

To select which most probable mode to use as the estimate of the actual mode in instances where the first most probable mode and second most probable mode are different angular modes, one or more of the following techniques can be used. In one example, intra prediction unit 46 can select as the estimate of the actual intra prediction mode the most probable mode that has an angle of prediction that is closer to the vertical angle (e.g. intra prediction mode 0 in FIGS. 3B and 3C). In another example, intra prediction unit 46 can select as the estimate of the actual intra prediction mode the most probable mode that is not between the vertical angle (e.g. mode 0) and the horizontal angle (e.g., intra prediction mode 1 in FIGS. 3B and 3C). In other words, if one of the two most probable modes is an intra prediction mode between intra prediction mode 0 and intra prediction mode 1, then intra prediction unit 46 can be configured to select as an estimate of the actual intra prediction mode the one of the most probable intra prediction modes that is not between intra prediction mode 0 and intra prediction mode 1.

In other examples, intra prediction unit 46 may select one of the most probable modes as the estimate of the actual intra prediction mode and signal the selection. The signaling of which most probable mode is the estimate of the actual mode can be, for example, included in a codeword, such that the codeword identifies both the estimate of the actual mode and the difference between the estimate of the actual mode and the actual mode.

In one example, intra prediction unit 46 can select as the estimate of the actual intra prediction mode the most probable mode which has the smaller intra mode number. For example, referring to FIG. 3B, intra prediction mode 0 may be more preferable than mode 1. Alternatively, the sequential mode ordering, a separate ordering of preference, or some other ordering can be used.

In one example, intra prediction unit 46 can select as the estimate of the actual intra prediction mode the most probable mode based on a neighboring block's information. For example, intra prediction unit 46 can check the intra prediction mode of the upper-left block and then pick as the estimate of the actual mode the most probable mode which is closer to the intra prediction mode of the above-left block. If, for example, an upper-neighboring block and a left-neighboring block are used to determine the most probable modes, the upper-left block may be used in this situation for selecting which most probable mode to use as an estimate of the actual mode. Using FIG. 4 as an example, if the modes of block 406 and block 410 are used as most probable modes, then the intra prediction mode of block 404 may be used to determine which of block 406 and block 410 is to be used as the estimate of the actual intra prediction mode. In particular, in one example, the mode of block 406 or 410 that is numerically closest to the mode of block 404, based on sequential mode order, is selected as the estimate of the actual intra prediction mode.

In one example, intra prediction unit 46 can select as the estimate of the actual intra prediction mode the most probable mode based on the most probable mode block information. For example, if one most probable mode is from an upper-neighboring block and one most probable mode is from a left-neighboring block, then intra prediction unit 46 may select as an estimate of the actual mode as the most probable mode which belongs to a block with a similar size of the current block. In addition to or alternatively to these criteria, PU depth, inter/intra mode, or some other type of block information may also be used.

According to additional techniques of this disclosure, video encoder 20 can determine an estimated actual intra prediction mode using both most probable modes as estimated actual intra prediction modes. For example, video encoder 20 can calculate a difference for an intra prediction mode by using the shortest distance, as measured by sequential mode order, to one of the most probable modes. The codewords can be assigned based on a sorted distance with shorter codewords generally being used for smaller distances. Using such a technique, several modes could have the same distance. Therefore, this disclosure describes techniques for differentiating between modes with the same distances. The techniques may, for example, be based on a preferred most probable mode, preferred prediction direction, and/or neighboring block information. In this context, "preferred" refers to a video encoder's preference in selecting a particular most probable mode or particular prediction direction for purposes of signaling an intra prediction mode, and does not necessarily equate to the most probable mode or prediction direction that offers the best coding performance.

As an example, assuming most probable mode 0 is a preferred mode relative to most probable mode 1, the distances between the most probable modes and the actual modes may be sorted as follows: MPM0_+1, MPM0_−1, MPM1_+1, MPM1_−1, MPM0_+2, MPM0_−2, MPM1_+2, MPM1_−2, and so on, with MPM0 corresponding to a first most probable mode and MPM1 corresponding to a second most probable mode. MPM0_+1 represents a distance of +1 (based on sequential mode order) from the first most probable mode, and MPM_−1 represents a distance of −1 from the first most probable mode. Alternatively, the sorted distances may be as MPM0_−1, MPM0_+1, MPM1_−1, MPM1_+1, MPM0_−2, MPM0_+2, MPM1_−2, MPM1_+2, and so on. These sorting orders represent merely two of many possible sorting orders. These sorting orders generally correspond to the length of the codeword assigned to each distance from smallest codeword to longest codeword. Thus, for the first sorting order shown above, MPM0_+1 may have the shortest codeword while MPM1_−2 has a longer codeword. In the second sorting order shown above, MPM0_1 may have the shortest codeword.

After predicting a current block, e.g., using intra prediction or inter-prediction, video encoder 20 may form a residual video block by subtracting the prediction data calculated by motion compensation unit 44 or intra prediction unit 46 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks and/or block sizes.

In some cases, entropy coding unit 56 or another unit of video encoder 20 may be configured to perform other coding functions, in addition to entropy coding and coding of the intra prediction mode as described above. For example, entropy coding unit 56 may be configured to determine coded block pattern (CBP) values for the blocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames in memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in memory 64. The reconstructed video block may be used by motion estimation unit 42 and motion compensation unit 44 as a reference block to inter-code a block in a subsequent video frame.

In this manner, video encoder 20 represents one example of a video decoder configured to determine a first most probable intra prediction mode and a second most probable intra prediction mode for a current video block, and based on the first most probable intra prediction mode and the second most probable intra prediction mode, determine an estimate of an actual intra prediction mode used to code the current video block. Video encoder 20 can determine the estimate of the actual intra prediction mode by selecting the first most probable mode as the estimate of the actual intra prediction mode in response to the first most probable mode being an angular intra prediction mode and the second most probable mode being a non-angular intra prediction mode and by selecting one of the first most probable mode and the second most probable mode as the estimate of the actual intra prediction in response to both the first most probable mode and the second most probable mode being angular prediction modes.

Figure 5:
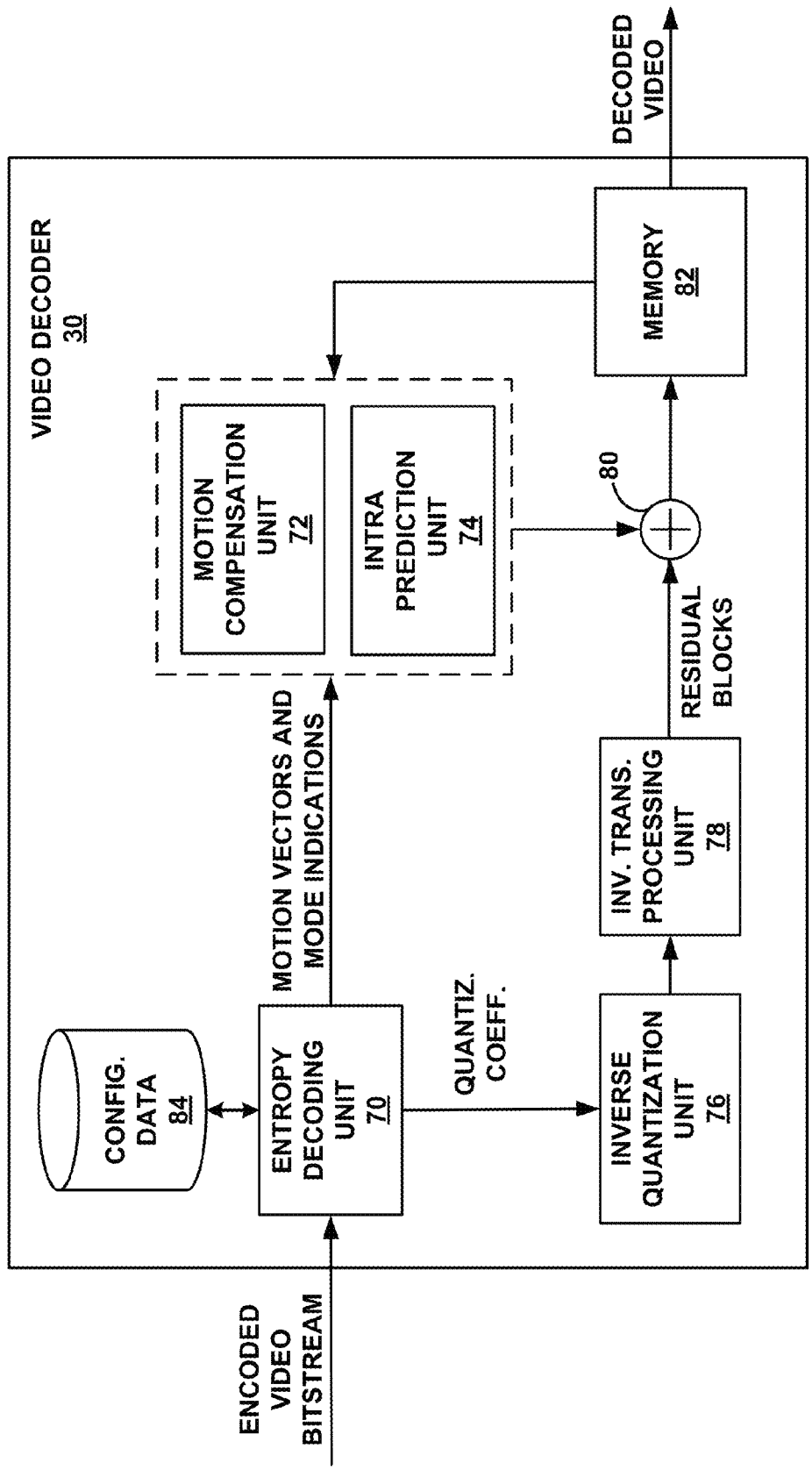
FIG. 5 is a block diagram illustrating an example of a video decoder that may implement techniques for decoding information indicative of an intra prediction mode.

FIG. 5 is a block diagram illustrating an example of video decoder 30, which decodes an encoded video sequence. In the example of FIG. 5, video decoder 30 includes an entropy decoding unit 70, motion compensation unit 72, intra prediction unit 74, inverse quantization unit 76, inverse transformation unit 78, memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Motion compensation unit 72 may use motion vectors received in the bitstream to identify a prediction block in reference frames in memory 82. Intra prediction unit 74 may use intra prediction modes received in the bitstream to form a prediction block from spatially adjacent blocks.

In an example of the techniques in this disclosure, entropy decoding unit 70 receives a codeword representative of an intra prediction mode to use to decode an encoded block of video data. The codeword may map to a difference value, and the difference value may identify a difference between an estimated actual intra prediction mode and an actual intra prediction mode. Intra prediction unit 74 may determine a context for the encoded block, e.g., based on intra prediction modes for a left-neighboring and top-neighboring block to the encoded block and/or a size for the encoded block. Based on the context, intra prediction unit 74 may determine one or more most probable intra prediction modes to use to decode the block. Based on the most probable modes, intra prediction unit 74 can determine an estimated actual intra prediction mode for the encoded block. Based on the estimated actual intra prediction mode and the difference value signaled in the encoded bitstream, intra prediction unit 74 can determine the actual intra prediction mode used to encode the encoded block.

Intra prediction unit 74 may use the indication of the intra prediction mode to intra-predict the encoded block, e.g., using pixels of neighboring, previously decoded blocks. For examples in which the block is inter-prediction mode encoded, motion compensation unit 72 may receive information defining a motion vector, as well as information indicating a prediction direction and reference picture index, in order to retrieve motion compensated prediction data for the encoded block. In any case, motion compensation unit 72 or intra prediction unit 74 may provide information defining a prediction block to summer 80.

Intra prediction unit 74 may generally implement the same techniques for determining most probable modes and estimated actual intra prediction modes as described above with reference to intra prediction unit 46 of FIG. 2. For example, in a manner similar to that described above, intra prediction unit 74 can determine most probable modes for a video block being decoded based on neighboring blocks that have already been decoded. After the most probable modes are determined, intra prediction unit 74 can parse syntax elements indicating if the actual intra prediction mode for the block being coded is one of the most probable modes. If the actual intra prediction mode is not one of the most probable intra prediction modes, then intra prediction unit 74 may determine an estimate for the actual mode based on the most probable modes, and parse syntax indicating a difference between the actual intra prediction mode and the estimate for the actual intra prediction mode. Video decoder 30 may, for example, receive difference information in the encoded video bitstream and determine the actual intra prediction mode for the current video block based on the difference information and the estimate of the actual intra prediction mode.

According to the techniques of this disclosure, when one most probable mode is an angular prediction mode and another most probable mode is a non-angular prediction mode, then intra prediction unit 74 can determine an estimate for the actual intra prediction mode by using the angular most probable mode as the estimate of the actual intra prediction mode.

When both most probable modes are angular prediction modes, the estimate of the actual mode can be one of the most probable modes. In instances where the first most probable mode and the second most probable are the same intra prediction mode, then intra prediction unit 72 can use that intra prediction mode as the estimate of the actual intra prediction mode. In instances where the first most probable mode and the second most probable mode are both angular modes but are not the same mode, then intra prediction unit 72 can select one of the two most probable modes to be the estimate of the actual mode, as opposed to using a mean or median of the two most probable modes as the estimate of the actual intra prediction mode.

To select which most probable mode to use as the estimate of the actual intra prediction mode in instances where the first most probable mode and second most probable mode are different angular modes, one or more of the following techniques can be used. In one example, intra prediction unit 72 can select as the estimate of the actual intra prediction mode the most probable mode that has an angle of prediction that is closer to the vertical angle (e.g. intra prediction mode 0 in FIGS. 3B and 3C). In another example, intra prediction unit 72 can select as the estimate of the actual intra prediction mode the most probable mode that is not between the vertical angle and the horizontal angle (e.g. intra prediction mode 1 in FIGS. 3B and 3C). In other words, if one of the two most probable modes is an intra prediction mode between intra prediction mode 0 and intra prediction mode 1, then intra prediction unit 72 can be configured to select as an estimate of the actual intra prediction mode the one of the most probable intra prediction modes that is not between intra prediction mode 0 and intra prediction mode 1.

In other examples, intra prediction unit 72 may select one of the most probable modes as the estimate of the actual intra prediction mode and signal the selection. The signaling of which most probable mode is the estimate of the actual mode can be, for example, included in the codeword, such that the codeword identifies both the estimate of the actual mode and the difference between the estimate of the actual mode and the actual mode.

In one example, intra prediction unit 72 can select as the estimate of the actual intra prediction mode the most probable mode which has the smaller intra mode number. For example, referring to FIG. 3B, intra prediction mode 0 may be more preferable than mode 1. Alternatively, the sequential mode ordering, a separate ordering of preference, or some other ordering can be used.

In one example, intra prediction unit 72 can select as the estimate of the actual intra prediction mode the most probable mode based on a neighboring block's information. For example, intra prediction unit 72 can check the intra prediction mode of the upper-left block and then pick as the estimate of the actual mode the most probable mode which is closer to the intra prediction mode of the above-left block. If, for example, an upper-neighboring block and a left-neighboring block are used to determine the most probable modes, the upper-left block may be used in this situation for selecting which most probable mode to use as an estimate of the actual mode. Using FIG. 4 as an example, if the modes of block 406 and block 410 are used as most probable modes, then the intra prediction of block 404 may be used to determine which of block 406 and block 410 is to be used as the estimate of the actual intra prediction mode.

In one example, intra prediction unit 72 can select as the estimate of the actual intra prediction mode the most probable mode based on the most probable mode block information. For example, if one most probable mode is from an upper-neighboring block and one most probable mode is from a left-neighboring block, then intra prediction unit 72 may select as an estimate of the actual mode the most probable mode which belongs to a block with a size that is identical or similar to the size of the current block. For example, if the block currently being coded is a 16×16 block, and the two neighboring blocks are 4×4 and 8×8 block respectively, then the mode of the 8×8 block may be selected as the estimate of the actual intra prediction mode because the 8×8 block is closer in size to the block being coded. In addition to or alternatively to these criteria, PU depth, inter/intra mode, or some other type of block information may also be used. For example, when choosing between two most probable modes, the most probable mode associated with a block that has the same or closest PU depth to the block being coded may be selected as the estimate of the actual intra prediction mode.

According to additional techniques of this disclosure, intra prediction unit 72 can determine an estimated actual intra prediction mode using both most probable modes as estimated actual intra prediction modes. For example, intra prediction unit 72 can calculate a difference for an intra prediction mode by using the shortest distance to the most probable modes. The codewords can be assigned based on the sorted distance with shorter codewords generally being used for smaller distance. Using such a technique, several modes could have the same distance. Therefore, this disclosure describes techniques for differentiating between modes with the same distances. The techniques may, for example, be based on a preferred most probable mode, preferred prediction direction, and/or neighboring block information.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by encoder 20 for each macroblock to determine a degree of quantization and, likewise, a degree of inverse quantization that should be applied.

Inverse transform processing unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra prediction unit 74 to form decoded blocks. If desired, a deblocking filter may also be applied to filter the decoded blocks in order to remove blockiness artifacts. The decoded video blocks are then stored in memory 82, which provides reference blocks for subsequent motion compensation and also produces decoded video for presentation on a display device (such as display device 32 of FIG. 1).

In this manner, video decoder 30 represents one example of a video decoder configured to determine a first most probable intra prediction mode and a second most probable intra prediction mode for a current video block, and based on the first most probable intra prediction mode and the second most probable intra prediction mode, determine an estimate of an actual intra prediction mode used to code the current video block. Video decoder 30 can determine the estimate of the actual intra prediction mode by selecting the first most probable mode as the estimate of the actual intra prediction mode in response to the first most probable mode being an angular intra prediction mode and the second most probable mode being a non-angular intra prediction mode and by selecting one of the first most probable mode and the second most probable mode as the estimate of the actual intra prediction in response to both the first most probable mode and the second most probable mode being angular prediction modes.

Figure 6:
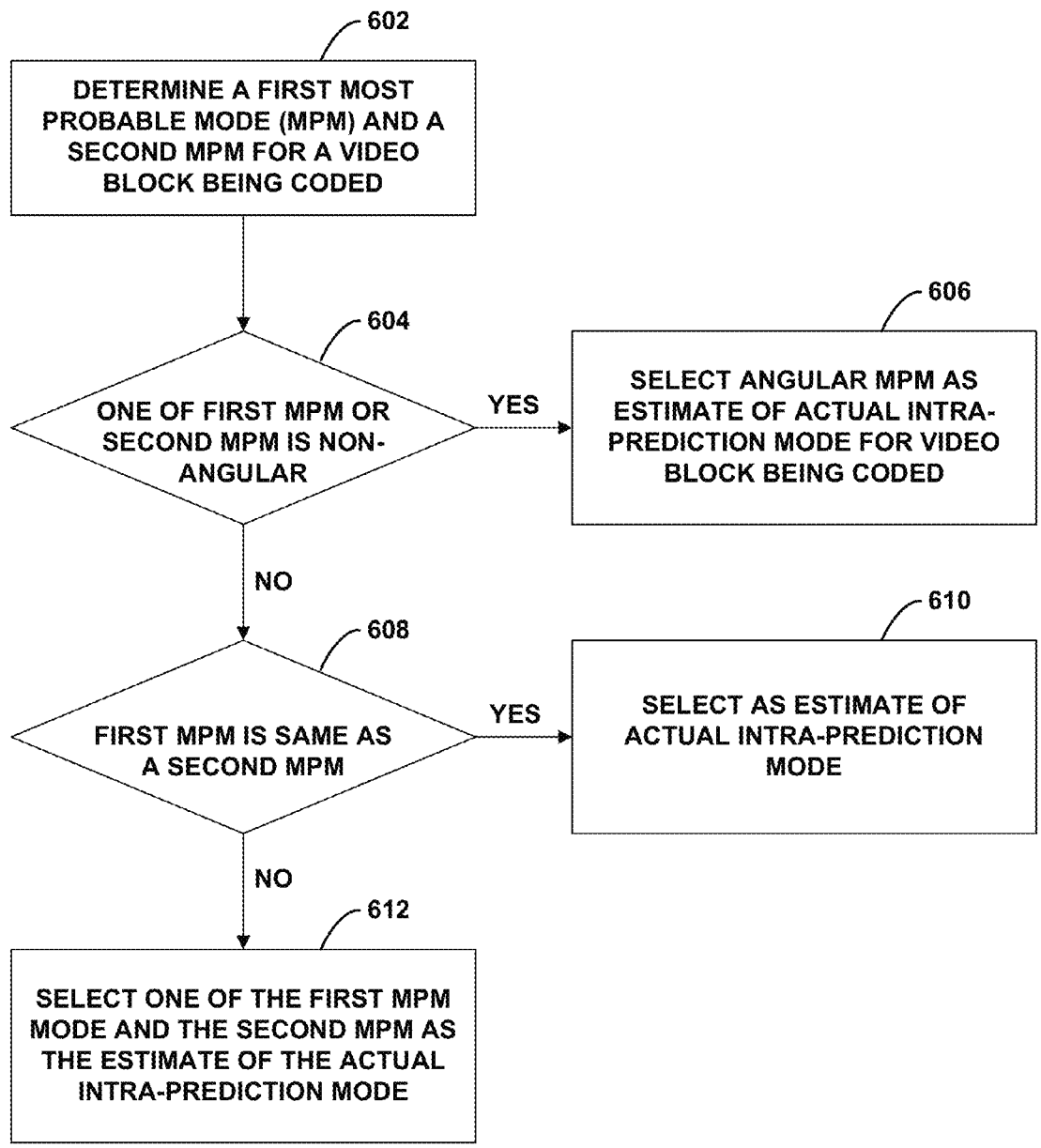
FIG. 6 is a flowchart depicting an example method of signaling intra prediction modes according to the techniques of this disclosure.

FIG. 6 is a flowchart depicting an example method of signaling intra prediction modes according to the techniques of this disclosure. The techniques of FIG. 6 will be explained with reference to a generic video coder, which may be either a video encoder or a video decoder, such as video encoder 20 and video decoder 30.

The video coder can determine a first most probable intra prediction mode and a second most probable intra prediction mode for a current video block (602). The first and second most probable intra prediction modes may be selected, for example, as the intra prediction modes assigned to an upper-neighboring block adjacent to the current block to be coded and the mode assigned to a left-neighboring block adjacent to the current block to be coded. If one of the first most probable mode and the second most probable mode is angular and one is non-angular (604, yes), then the video coder can select the most probable mode that is angular as the estimate of the actual intra prediction mode of the current video block (606). If the first most probable mode and the second most probable mode are both angular modes (604, no) and are the same (608, yes), then the video coder can select that mode as the estimate of the actual intra prediction mode (610). If the first most probable mode and the second most probable mode are both angular modes (604, no) but are not the same (608, no), then the video coder can select one of the first most probable mode and the second most probable mode as the estimate of the actual intra prediction (612). In this case, the video coder can select which of the first most probable mode and the second most probable mode to use as the estimate of the actual intra prediction mode using one or more of the techniques described above.

In instances where the video coder of FIG. 6 is a video encoder, then the video coder may determine a difference between the determined estimate of the actual intra prediction mode and the actual intra prediction mode used to code a block of video data and include an indication of the difference in a bitstream of encoded video data. In instances where the video coder of FIG. 6 is a video decoder, the video coder may receive an indication of a difference between the estimate of the actual intra prediction mode and the actual intra prediction mode in a bitstream of encoded video data and use the difference information and the determined estimate of the actual intra prediction mode to determine the actual intra prediction mode used to code a block of video data.

The video coder described with reference to FIG. 6 may also determine more than two most probable intra prediction modes, but for purposes of this example, the estimate of the actual intra prediction mode can be selected to be one of the first most probable intra prediction mode and the second most intra prediction probable mode.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   for a current video block, determining a first most probable intra prediction mode and a second most probable intra prediction mode;
   receiving one or more codewords indicating that an actual intra prediction mode used to code the current video block is an intra prediction mode other than the first most probable intra prediction mode and other than the second most probable intra prediction mode;
   in response to the one or more codewords indicating that the actual intra prediction mode used to code the current video block is the intra prediction mode other than the first most probable intra prediction mode and other than the second most probable intra prediction mode, selecting one of the first most probable mode or the second most probable mode as an estimate of the actual intra prediction mode used to code the current video block, wherein selecting the estimate of the actual intra prediction mode comprises:
      in response to the first most probable mode being an angular intra prediction mode and the second most probable mode being a non-angular intra prediction mode, selecting the first most probable mode as the estimate of the actual intra prediction mode;
      in response to both the first most probable mode and the second most probable mode being different angular prediction modes, selecting one of the first most probable mode or the second most probable mode as the estimate of the actual intra prediction mode based on at least one of which of the first most probable mode and the second most probable mode has a smaller intra mode number and which of the first most probable mode and the second most probable mode is associated with a block of video data that is closer in size to the current video block;
   receiving difference information;
   determining an actual intra prediction mode for the current video block based on the estimate of the actual intra prediction mode and the difference information; and
   generating a reconstructed video block using the actual intra prediction mode.

2. The method of claim 1, wherein selecting the one of the first most probable mode and the second most probable mode as the estimate of the actual intra prediction mode further comprises signaling one of the first most probable mode and the second most probable mode as the estimate of the actual intra prediction mode.

3. The method of claim 1, wherein selecting the one of the first most probable mode and the second most probable mode as the estimate of the actual intra prediction mode further comprises selecting as the estimate of the actual intra prediction mode which of the first most probable mode and the second most probable mode has a smaller intra mode number.

4. The method of claim 1, wherein selecting the one of the first most probable mode and the second most probable mode as the estimate of the actual intra prediction mode further comprises selecting which of the first most probable mode and the second most probable mode is associated with a block of video data that is closer in size to the current video block.

5. The method of claim 1, further comprising;
   receiving the video data at a receiver of a wireless communication device;
   storing the video data on a memory of the wireless communication device; and
   processing, by one or more processors, the video data stored in the memory.

6. The method of claim 5, wherein the wireless communication device comprises a cellular telephone, and wherein receiving the video data at the receiver comprises demodulating the video data according to a cellular communication standard.

7. A device for coding video data, the device comprising:
   a memory for storing video data; and
   a video coder comprising one or more processors configured to:
      for a current video block of the video data, determine a first most probable intra prediction mode and a second most probable intra prediction mode;
      receive one or more codewords indicating that an actual intra prediction mode used to code the current video block is an intra prediction mode other than the first most probable intra prediction mode and other than the second most probable intra prediction mode;
      in response to the one or more codewords indicating that the actual intra prediction mode used to code the current video block is the intra prediction mode other than the first most probable intra prediction mode and other than the second most probable intra prediction mode, select one of the first most probable mode or the second most probable mode as an estimate of the actual intra prediction mode used to code the current video block, wherein to select the estimate of the actual intra prediction mode the one or more processors are further configured to:
         in response to the first most probable mode being an angular intra prediction mode and the second most probable mode being a non-angular intra prediction mode, select the first most probable mode as the estimate of the actual intra prediction mode;
         in response to both the first most probable mode and the second most probable mode being different angular prediction modes, select one of the first most probable mode or the second most probable mode as the estimate of the actual intra prediction mode based on at least one of which of the first most probable mode and the second most probable mode has a smaller intra mode number and which of the first most probable mode and the second most probable mode is associated with a block of video data that is closer in size to the current video block; and
      code difference information, wherein the difference information comprises a difference between the estimate of the actual intra prediction mode and the actual intra prediction mode.

8. The device of claim 7, wherein the video coder is configured to select the one of the first most probable mode and the second most probable mode as the estimate of the actual intra prediction mode by signaling one of the first most probable mode and the second most probable mode as the estimate of the actual intra prediction mode.

9. The device of claim 7, wherein the video coder is configured to select the one of the first most probable mode and the second most probable mode as the estimate of the actual intra prediction mode by selecting as the estimate of the actual intra prediction mode which of the first most probable mode and the second most probable mode has a smaller intra mode number.

10. The device of claim 7, wherein the video coder is configured to select the one of the first most probable mode and the second most probable mode as the estimate of the actual intra prediction mode by selecting which of the first most probable mode and the second most probable mode is associated with a block of video data that is closer in size to the current video block.

11. The device of claim 7, wherein the video coder is a video decoder, and wherein coding the difference information comprises receiving the difference information.

12. The device of claim 11, wherein the video coder is further configured to:
generate a reconstructed video block using the actual intra prediction mode.

13. The device of claim 11, wherein the video coder comprises a video encoder, and wherein coding the difference information comprises signaling the difference information in an encoded bitstream.

14. The device of claim 7, wherein the device comprises at least one of:
an integrated circuit;
a microprocessor; or
a wireless communication device that includes the video coder.

15. The device of claim 7, wherein the device comprises a wireless communication device, further comprising a receiver configured to receive encoded video data.

16. The device of claim 15, wherein the wireless communication device comprises a telephone handset and wherein the receiver is configured to demodulate, according to a wireless communication standard, a signal comprising the encoded video data.

17. An apparatus for coding video data, the apparatus comprising:
means for determining a first most probable intra prediction mode and a second most probable intra prediction mode for a current video block;
means for receiving one or more codewords indicating that an actual intra prediction mode used to code the current video block is an intra prediction mode other than the first most probable intra prediction mode and other than the second most probable intra prediction mode;
means for selecting an estimate of an actual intra prediction mode used to code the current video block based on the first most probable intra prediction mode and the second most probable intra prediction mode and in response to the one or more codewords indicating that the actual intra prediction mode used to code the current video block is an intra prediction mode other than the first most probable intra prediction mode and other than the second most probable intra prediction mode, wherein the means for selecting the estimate of the actual intra prediction mode comprises:
means for selecting the first most probable mode as the estimate of the actual intra prediction mode in response to the first most probable mode being an angular intra prediction mode and the second most probable mode being a non-angular intra prediction mode;
means for selecting one of the first most probable mode or the second most probable mode as the estimate of the actual intra prediction in response to both the first most probable mode and the second most probable mode being different angular prediction modes mode based on at least one of which of the first most probable mode and the second most probable mode has a smaller intra mode number and which of the first most probable mode and the second most probable mode is associated with a block of video data that is closer in size to the current video block; and
means for coding difference information, wherein the difference information comprises a difference between the estimate of the actual intra prediction mode and the actual intra prediction mode.

18. The apparatus of claim 17, wherein the means for selecting the one of the first most probable mode and the second most probable mode as the estimate of the actual intra prediction mode comprises means for signaling one of the first most probable mode and the second most probable mode as the estimate of the actual intra prediction mode.

19. The apparatus of claim 17, wherein the means for selecting the one of the first most probable mode and the second most probable mode as the estimate of the actual intra prediction mode comprises means for selecting as the estimate of the actual intra prediction mode which of the first most probable mode and the second most probable mode has a smaller intra mode number.

20. The apparatus of claim 17, wherein the means for selecting the one of the first most probable mode and the second most probable mode as the estimate of the actual intra prediction mode comprises means for selecting which of the first most probable mode and the second most probable mode is associated with a block of video data that is closer in size to the current video block.

21. The apparatus of claim 17, wherein the apparatus comprises a video decoder, and wherein the means for coding the difference information comprises means for receiving the difference information.

22. The apparatus of claim 21, further comprising:
means for generating a reconstructed video block using the actual intra prediction mode.

23. The apparatus of claim 17, wherein the apparatus comprises a video encoder, and wherein the means for coding the difference information comprises means for signaling in an encoded bitstream the difference information.

24. A non-transitory computer-readable storage medium storing instructions operable to cause one or more processors to:
for a current video block, determine a first most probable intra prediction mode and a second most probable intra prediction mode;
receive one or more codewords indicating that an actual intra prediction mode used to code the current video block is an intra prediction mode other than the first most probable intra prediction mode and other than the second most probable intra prediction mode;
in response to the one or more codewords indicating that the actual intra prediction mode used to code the current video block is an intra prediction mode other than the first most probable intra prediction mode and other than the second most probable intra prediction mode, selecting one of the first most probable mode or the second most probable mode as an estimate of the actual intra prediction mode used to code the current video block based on the first most probable intra prediction mode and the second most probable intra prediction mode, wherein the instructions cause the one or more processors to select the estimate of the actual intra prediction mode by:
  in response to the first most probable mode being an angular intra prediction mode and the second most probable mode being a non-angular intra prediction mode, selecting the first most probable mode as the estimate of the actual intra prediction mode;
  in response to both the first most probable mode and the second most probable mode being different angular prediction modes, selecting one of the first most probable mode or the second most probable mode as the estimate of the actual intra prediction mode based on at least one of which of the first most probable mode and the second most probable mode has a smaller intra mode number and which of the first most probable mode and the second most probable mode is associated with a block of video data that is closer in size to the current video block; and
code difference information, wherein the difference information comprises a difference between the estimate of the actual intra prediction mode and the actual intra prediction mode.

\* \* \* \* \*